(12) United States Patent  
Bayer et al.

(10) Patent No.: US 7,017,883 B2  
(45) Date of Patent: Mar. 28, 2006

(54) PIEZOELECTRICALLY ACTUATED FLUID VALVE

(75) Inventors: Ronald Bayer, Mühlheim/Main (DE); Ulrich Neumann, Rossdorf (DE); Jürgen Böhm, Oberneisen (DE); Johann Jungbecker, Badenheim (DE); Ingo Viehböck, Idstein (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 77 days.

(21) Appl. No.: 10/485,162

(22) PCT Filed: Aug. 9, 2002

(86) PCT No.: PCT/EP02/08952

§ 371 (c)(1),  
(2), (4) Date: Jan. 29, 2004

(87) PCT Pub. No.: WO03/016762

PCT Pub. Date: Feb. 27, 2003

(65) Prior Publication Data

US 2004/0232371 A1   Nov. 25, 2004

(30) Foreign Application Priority Data

Aug. 14, 2001 (DE) ............... 101 38 830  
Dec. 17, 2001 (DE) ............... 101 61 888

(51) Int. Cl.  
*F16K 31/02* (2006.01)

(52) U.S. Cl. ............... 251/129.06; 137/625.44

(58) Field of Classification Search ........... 251/129.06; 137/625.44  
See application file for complete search history.

(56) References Cited

U.S. PATENT DOCUMENTS

| 4,625,139 | A | * | 11/1986 | Frisch ................... 310/330 |
| 4,934,401 | A |   | 6/1990  | Ikehata et al. |
| 5,079,472 | A |   | 1/1992  | Uhl et al. |
| 5,203,537 | A |   | 4/1993  | Jacobs et al. |
| 5,340,081 | A |   | 8/1994  | Wright |
| 5,630,440 | A |   | 5/1997  | Knutson et al. |
| 5,669,416 | A |   | 9/1997  | Nusche |
| 6,173,744 | B1|   | 1/2001  | Frisch et al. |
| 6,499,509 | B1| * | 12/2002 | Berger et al. ......... 137/625.65 |
| 6,581,638 | B1| * | 6/2003  | Frisch et al. .......... 137/596.17 |

FOREIGN PATENT DOCUMENTS

| DE | 3935474 A1  | 1/1991  |
| DE | 4410153 C1  | 2/1995  |
| DE | 29514495 U1 | 12/1995 |
| DE | 19644564 A1 | 4/1998  |
| DE | 19712855 A1 | 10/1998 |
| DE | 19714045 A1 | 10/1998 |

(Continued)

OTHER PUBLICATIONS

International Search Report of Application Serial No. PCT/EP02/08952 dated Dec. 4, 2002.

(Continued)

*Primary Examiner*—J. Casimer Jacyna  
(74) *Attorney, Agent, or Firm*—RatnerPrestia

(57) ABSTRACT

In a piezoelectrically actuated fluid valve the bending transducer includes another bearing point at its second end remote from the immovable bearing and the valve closure member points to the valve seat in a defined partial span width between the two ends of the bending transducer.

15 Claims, 6 Drawing Sheets

FOREIGN PATENT DOCUMENTS

| | | |
|---|---|---|
| DE | 200 19 705 U1 | 3/2001 |
| EP | 0145859 A2 | 6/1985 |
| EP | 0565510 A2 | 10/1993 |
| EP | 0922893 A1 | 6/1999 |
| EP | 0961062 A1 | 12/1999 |

OTHER PUBLICATIONS

German Search Report of Application Serial No. 101 61 888.3 dated May 13, 2002.

* cited by examiner

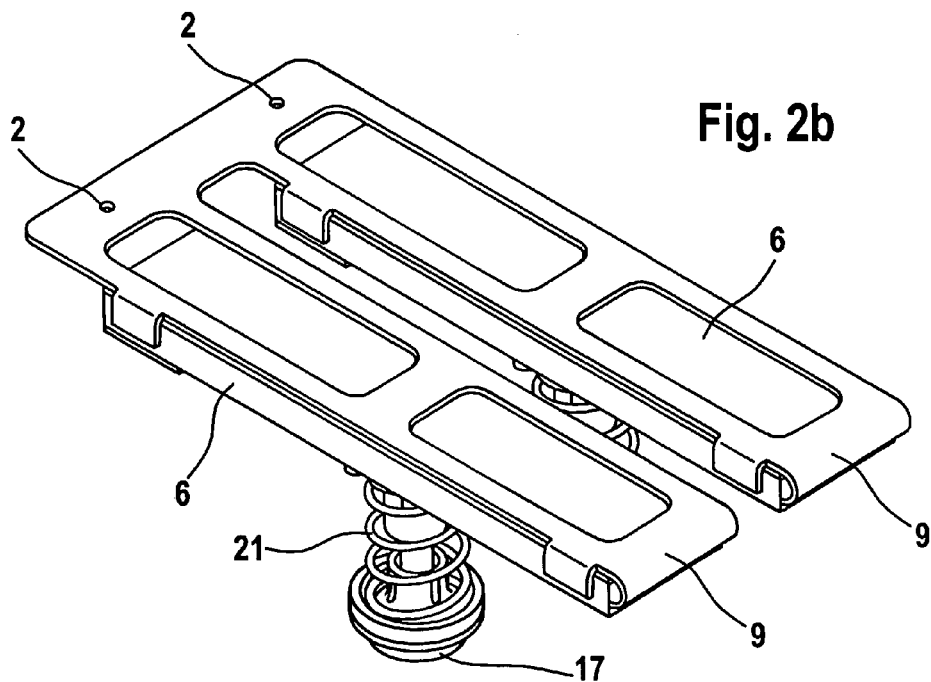
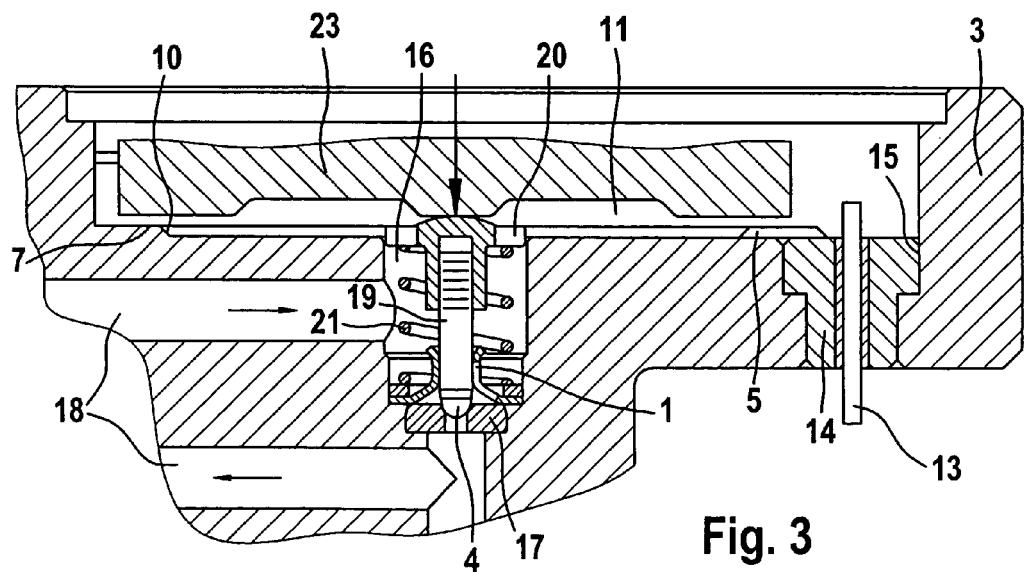

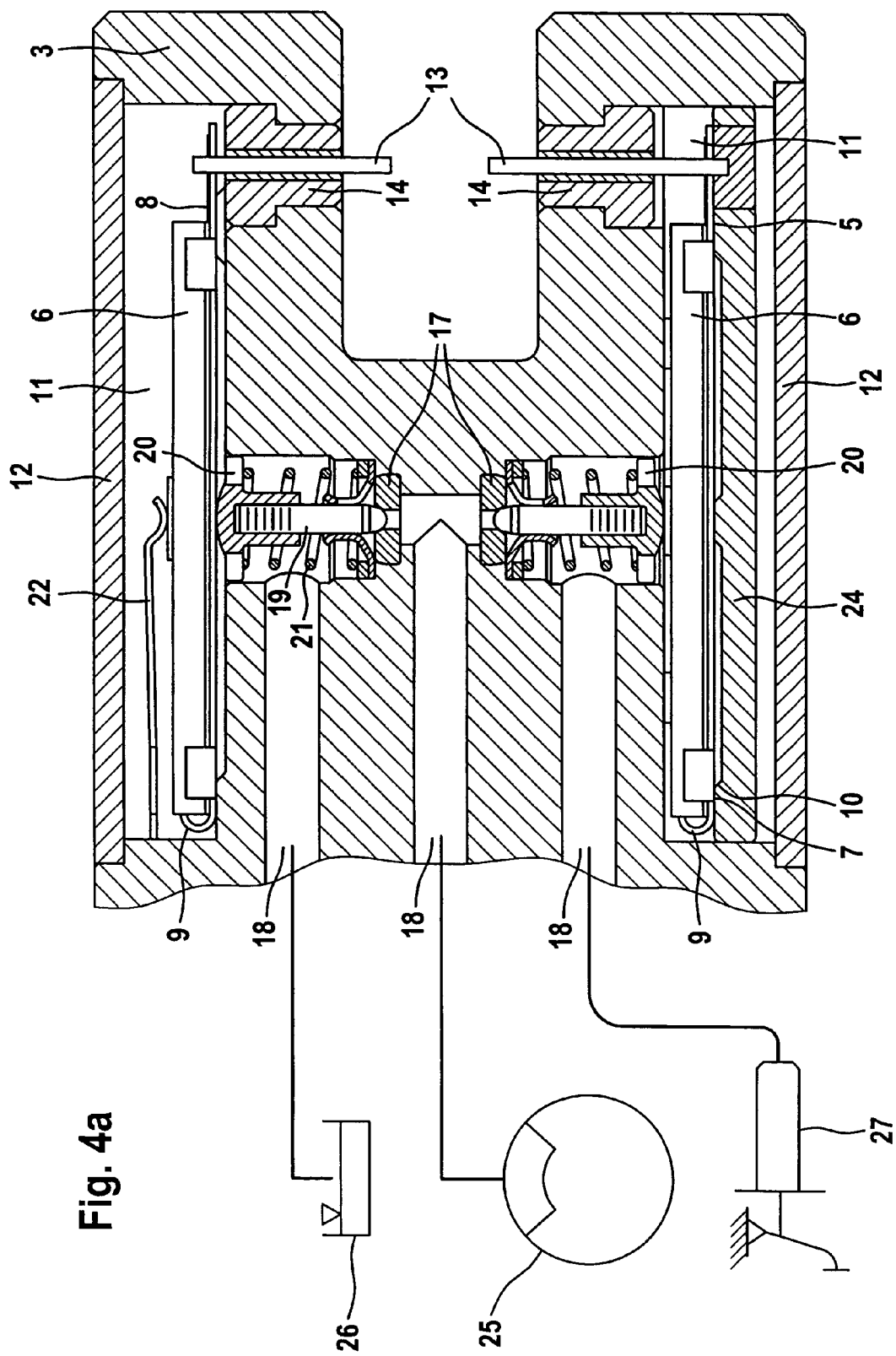

PIEZOELECTRICALLY ACTUATED FLUID VALVE

TECHNICAL FIELD

The present invention relates to a piezoelectrically actuated fluid valve, in particular for an electronically controllable motor vehicle brake system.

BACKGROUND OF THE INVENTION

A fluid valve of the type mentioned hereinabove is disclosed in DE 44 10 153 C1. In this prior art fluid valve, a piezoelectric bending transducer is compressed exclusively at one end in a valve housing, while the free end of the bending transducer carries a valve closure member cooperating with a valve seat arranged in the flow path. To increase the adjusting force of the bending transducer, an additional bearing point is provided in the valve housing spaced from the point of compression. The adjusting force necessary for high hydraulic pressures cannot be achieved by the chosen mounting support of the bending transducer. Further, the design chosen for the bending transducer does not ensure that the valve closure member is sealed at the valve seat with sufficient accuracy when exposed to different operating temperatures.

An object of the invention is to improve upon a fluid valve of the type mentioned hereinabove in such a fashion that a simple piezoelectric valve is achieved having overcome the mentioned shortcomings.

BRIEF DESCRIPTION OF THE DRAWINGS

FIG. 1b is an exploded view of the piezoelectric valve of FIG. 1a.

FIG. 2b is a perspective view of two bending transducers arranged in parallel one beside the other on one single accommodating plate for two fluid valves of the construction shown in FIG. 2a.

FIG. 3 shows the adjustment of the fluid valve shown in FIGS. 1a, 1b by means of a calibrating punch.

FIG. 4a is the diametrical arrangement of the fluid valves according to FIGS. 1a, 2a in a joint valve housing.

DETAILED DESCRIPTION OF THE PREFERRED EMBODIMENTS

Figure 1A:
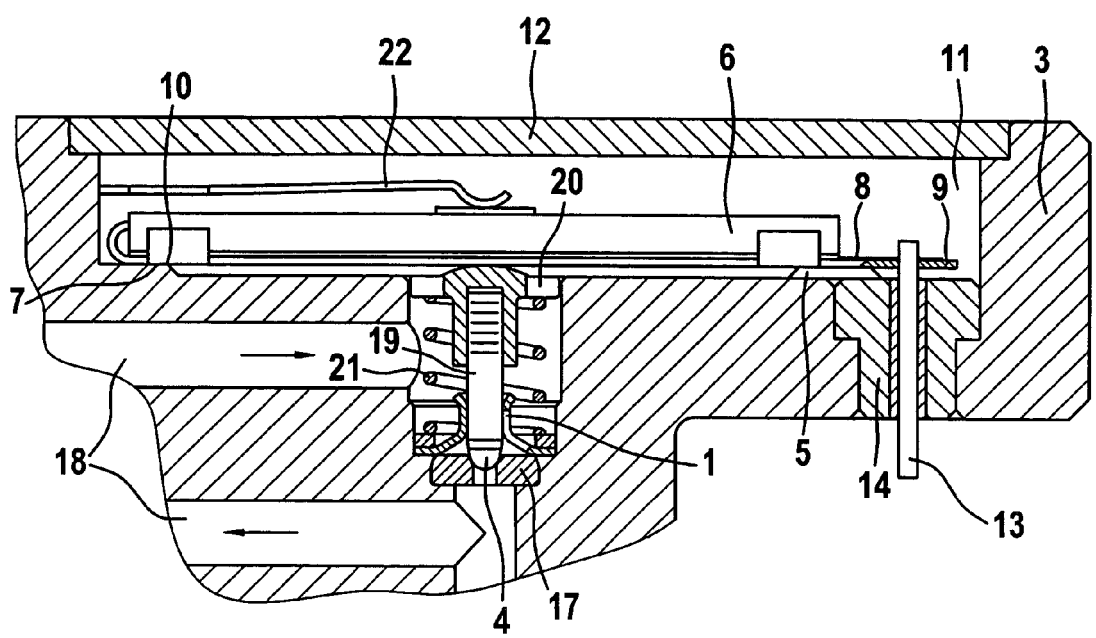
FIG. 1a is a longitudinal view of a piezoelectric fluid valve closed in its basic position.

Initially, all features common for the above-mentioned embodiments according to FIGS. 1a to 4b will be explained.

The fluid valves illustrated in FIGS. 1a to 4b are favorably used in electronically controllable motor vehicle brake systems. Irrespective of whether the illustrated piezoelectric valves are configured as normally open or normally closed valves, the piece parts of the valves are disposed in an essentially block-shaped valve housing 3, opening laterally into which is a flow channel 18 that is in connection with either a brake pressure generator 27 or a high-pressure energy supply unit of a motor vehicle brake system in the area of the fluid valve that is normally open in its basic position. In the area of the fluid valve that is normally closed in its basic position, another flow channel 18 is connected either to a pressure fluid collecting means 26, e.g. a low-pressure accumulator, or to a supply reservoir of the brake pressure generator 27. Spaced from the point where the port opens into the valve housing 3, the flow channel 18 in each case continues via the valve seats 17 of the normally open and normally closed fluid valves in the direction of a wheel brake 25. For opening and closing the valve seat 17, each fluid valve shown has a valve closure member 4 respectively actuated by a piezoelectric bending transducer 6 that is arranged in the valve housing 3 and functionally configured as a transverse beam supported on either side. Each bending transducer 6 shown is fixed at an end of the transverse beam in the valve housing 3 by means of a fixed-type bearing 5. The electrical contacting for the current supply of the bending transducer 6 is also provided at this end of the transverse beam.

To produce a maximum possible setting force for application to the valve closure member 4 for each fluid valve shown also under high hydraulic pressure, each bending transducer 6 includes an additional bearing point 7 in the valve housing 3 at its second end remote from the immovable bearing 5, on the one hand. On the other hand, however, the valve closure member 4 abutting on the transverse beam is also required to be arranged in a defined partial span width between the two supported ends of the bending transducer 6, and namely preferably at half the span width of the transverse beam in order to apply the high adjusting force of the bending transducer 6 as effectively as possible to the valve seat 17 by way of the valve closure member 4. To accommodate the temperature-responsive length variations of the bending transducer 6 without undesirable mechanic restraints and without negative influence on valve actuation and valve sealing, the additional bearing point of the bending transducer 6 is designed as a movable bearing 7.

The illustrated bending transducers 6 are comprised of several piezoceramic layers being preferably cemented with several subbases to form a stack, said subbases being connected to several electric conductor paths 8 for the electric activation, preferably made in foil or thin-film technology. The said components are fixed on a thin-walled accommodating plate 9. Said accommodating plate 9 is supported with its one end on a ramp 10 that is provided at a pan 11 of the valve housing 3 for the normally closed fluid valve, however, is provided at a bearing plate 24 arranged between the accommodating plate 9 and the cover 12 for the normally open fluid valve. Ramp 10 is always disposed within the valve housing 3 in the area of the movable bearing 7, on which the bending transducer 6 is respectively supported in a slidable way with its second end 3 remote from the immovable bearing 5 in order to accommodate length variations.

The immovable bearing 5 of each fluid valve is disposed directly beside the stiff electrical contact pin 13 that extends through an opening 2 in the accommodating plate 9 to the conductor paths 8. The contact pin 13 is electrically insulated within a glass socket 14. Contact pin 13 is inserted with glass socket 14 into a first stepped bore 15 of the valve housing 3 being in alignment with the opening 2 in the accommodating plate 9. In parallel beside the first stepped bore 15, each fluid valve—at half the span width of the transverse beam—includes a second stepped bore 16 penetrated by the flow channel 18 and accommodating the valve closure member 4 that is operable by the bending transducer 6 and directed towards the valve seat 17. The bending transducer 6 of each fluid valve is positioned in a pan 11 of the valve housing 3 that is fluid-tightly closed by a cover 12. The bottom of pan 11 accommodates the two stepped bores 15, 16.

Each valve closure member 4 is fitted to a valve tappet 19 whose tappet head 20 projects slightly from the stepped bore 16 under the effect of a valve spring 21 and, thus, is urged by the valve spring 21 against the bending transducer 6 within the pan 11 at a defined distance between the immovable and the movable bearing 5, 7. Close to the valve closure member 4, valve tappet 19 is centered in the direction of the valve seat 17 by means of a guiding sleeve 1 which is aligned coaxially to the valve seat 17 in the second stepped bore 16 of each fluid valve. The end of the valve spring 21 remote from the tappet head 20 is supported at the foot of the guiding sleeve 1.

Irrespective of the common features of the normally open and normally closed piezoelectric fluid valves illustrated as described hereinabove, the special characteristics of the individual fluid valves will be described in the following:

FIG. 1a shows a longitudinal view of a piezoelectric fluid valve normally closed in its basic position in a cross-section of a valve housing 3 with the previously described features, however, with the special feature that a closure spring 22 is arranged between the cover 12 and the bending transducer 6. The closing force of said closure spring 22 is rated to exceed the opening force of the valve spring 21 so that the closing position of the valve closure member 4 at the valve seat 17 is ensured when the piezoelectric actuation is omitted.

When a voltage potential is applied to the piezoceramic layers of the bending transducer 6, the purposeful deformation of the individual subbases causes deflection of the transverse beam supported on either side in the valve housing 3 in the direction of the closure spring 22, the deflection of the transverse beam 6 determining the valve stroke. Due to the effect of the valve spring 21 compressed between the valve seat 4 and the tappet head 20, the valve tappet 19 will always stay in contact with the bending transducer 6 so that the valve closure member 4 will open the aperture in the valve seat 17 during deflection of the bending transducer 6. In this open position of the normally closed fluid valve, pressure fluid of the wheel brake 25 escapes through the flow channel 18 into the initially mentioned pressure fluid collecting means 26.

Figure 1B:
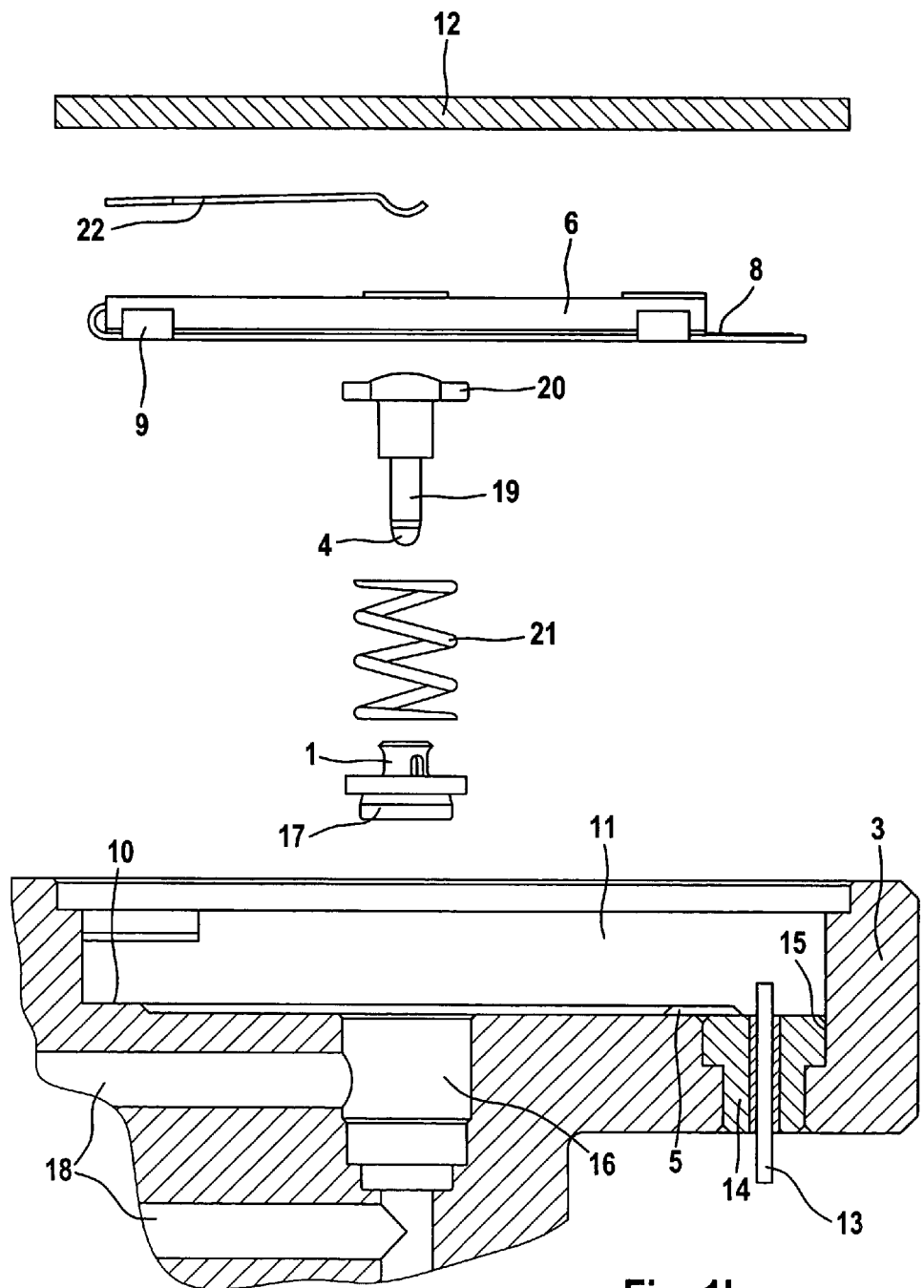

To illustrate the details of the fluid valve according to FIG. 1a, the piezoelectric fluid valve closed in the initial position is shown in an exploded view in FIG. 1b according to the order of assembly of the piece parts. This is because as soon as the glass socket 14 with the contact pin 13 is inserted into the first stepped bore 15 of the valve housing 3, the disc-shaped valve seat 17 is pressed into the second stepped bore 16. The guiding sleeve 1 and the helical valve spring 21 will follow into which the valve tappet 19 provided with the valve closure member 4 and the mushroom-shaped tappet head 20 is inserted.

To adjust the valve closure member 4 and compensate manufacturing tolerances, the tappet head 20 is adjustable by way of a press fit at the valve tappet 19 so that a calibrating punch 23 is used to press the tappet head 20 onto the valve tappet 19 until the calibrating punch 23 with its fitting surfaces bears against the bottom of the pan 11 (see FIG. 3). Thus, the calibrating punch 23 determines the projecting end of the tappet head 20 at the bottom of pan 11, said projecting end corresponding to the maximum valve stroke.

After the calibrating punch 23 is removed, the accommodating plate 9 carrying the bending transducer 6 with the end designed as movable bearing 7 is seated onto the ramp 10 and with the end designed as immovable bearing 5 is seated onto the contact pin 13. Additionally, tappet head 20 either touches the bottom side of the accommodating plate 9 or, through a window in the accommodating plate 9, touches the bottom side of the bending transducer 6. The closure spring 22 is positioned on the top side of the bending transducer 6 in alignment with the axis of the valve tappet. Subsequently, the valve housing 3 is fluid-tightly closed by means of a cover 12 to be fitted and welded in the pan 11.

Figure 1C:
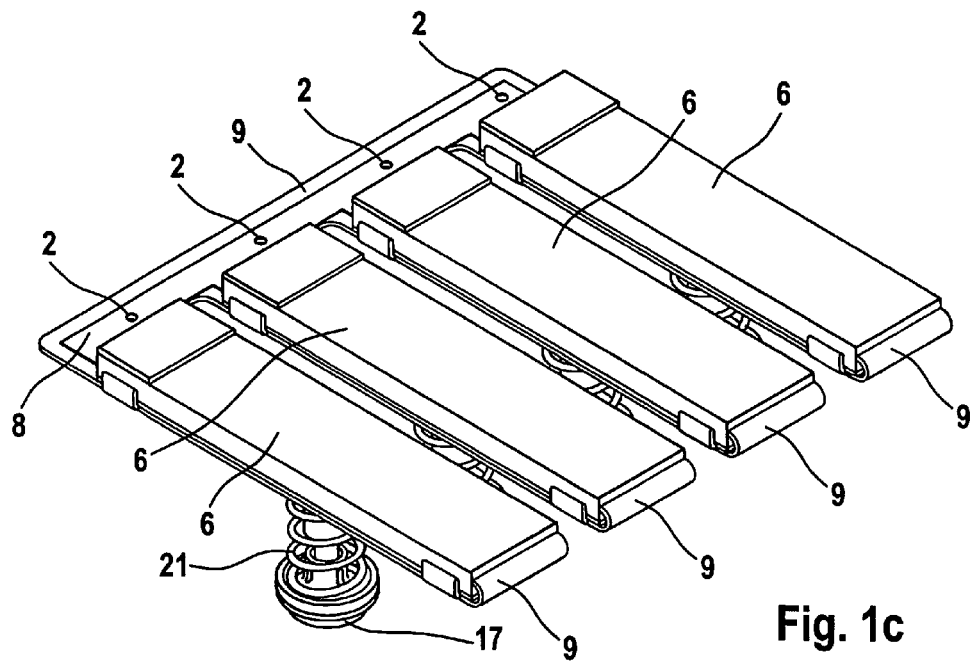
FIG. 1c is a perspective view of four bending transducers arranged in parallel one beside the other on one single accommodating plate for four fluid valves of the construction shown in FIGS. 1a, 1b.

Supplemental to the embodiments of FIGS. 1a and 1b, FIG. 1c shows a perspective view of four bending transducers 6 arranged parallel side by side on an accommodating plate 9 for the actuation of four normally closed fluid valves which can be fitted in series into a valve housing 3 of the above-mentioned type. FIG. 1c illustrates the accommodating plate 9 essentially composed of four tongues that are offset at the top of the individual tongue edges like lugs in sections for the purpose of fixation of the bending transducers 6. The end portion at the accommodating plate 9 adopting the function of the immovable bearing 5 is enlarged like a web corresponding to the chosen parallel arrangement of the bending transducers 6.

Figure 2A:
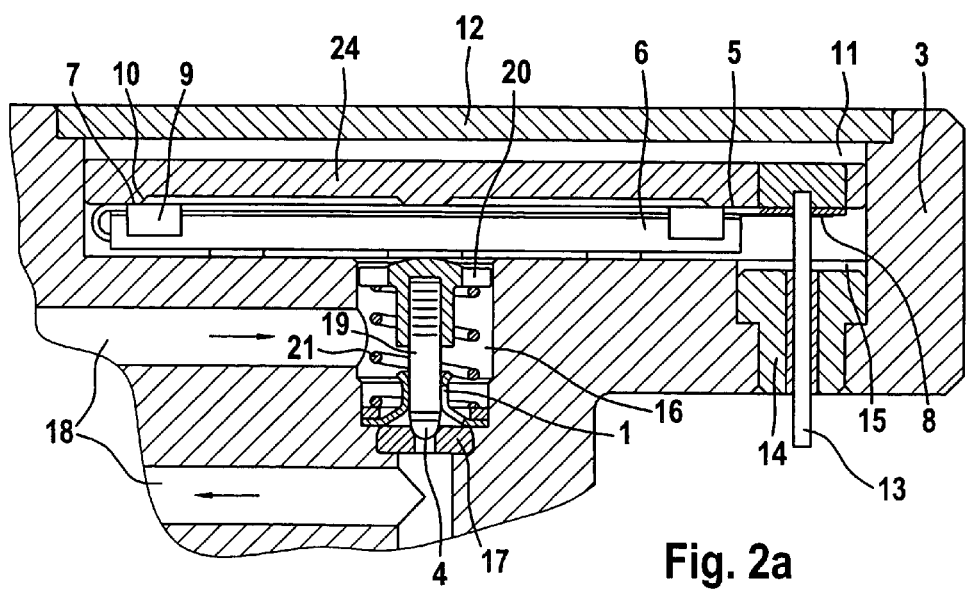
FIG. 2a is a longitudinal view of a piezoelectric fluid valve opened in its basic position.

Different from the previous explanations, FIG. 2a shows a longitudinal view of a normally open piezoelectric fluid valve whose immovable and movable bearings 5, 7 are not provided at the bottom of pan 11 but at a bearing plate 24 inserted into said pan 11 between the cover 12 and the bending transducer 6. The other valve components are identical with the valve components known from FIGS. 1a and 1b. The direction of effect of the bending transducer 6 used in the fluid valve normally open in its basic position is opposite to the direction of effect of the bending transducer 6 used in the normally closed fluid valve so that the bending transducer 6 with the accommodating plate 9 known from FIGS. 1a and 1b is only required to be inserted in the reverse mounting position into the valve housing 3 according to FIG. 2a, what finally leads also to the use of the bearing plate 24. Said bearing plate 24 is spaced from the bottom of pan 11 in such a way that, due to the effect of the valve spring 21, the valve closure member 4 in its initial position is lifted from the valve seat 17. In the piezoelectrically excited switch position, the bending transducer 6 presses the tappet head 20 in a downward direction proportionally to the piezoelectric exciting current, with the result that the valve closure member 4 moves in the direction of the valve seat 17. Consequently, the closure spring 22 known from FIGS. 1a, 1b is eliminated.

For the fluid valve of FIG. 2a, the adjustment of the valve closure member 17 is principally effected by means of a calibrating punch 23 according to the measure known already for the fluid valve closed in the basic position. Different from the illustration of FIG. 3, the calibrating punch 23 for the fluid valve according to FIG. 2a merely has an increased distance between the bottom of pan 11 and the point of abutment of the tappet head 20 on the calibrating punch 23 in order that the valve closure member 4 in its basic position is lifted from the valve seat 17 by the desired extent of opening.

FIG. 2b discloses with respect to FIG. 2a a perspective view of the accommodating plate 9, on the bottom side of which a pair of bending transducers 6 are incorporated in parallel arrangement and used for a valve assembly composed of two normally open fluid valves. The two tongues of the accommodating plate 9 that are arranged side by side by way of a bridge in the area of the immovable bearing 5 include cutouts being closed both at half the span width and at the ends of the bending transducer 6. The closed end and mid portions are supported on the bearing plate 24 with respect to the installation position according to FIG. 2a.

Based on the paired combination of the normally open fluid valves according to FIG. 2b, FIG. 4a shows in a longitudinal cross-section taken through a symmetrically divided valve housing 3 a diametrical arrangement of piezoelectrically actuated, normally open and normally closed fluid valves of the type already referred to. The components of the normally open and normally closed fluid valves are thus positioned mirror-symmetrically relative to the first portion of the flow channel 18 that is provided in the center of the valve housing 3 and connected directly to a wheel brake 25. This first portion of the flow channel 18 is forked between the two valve seats 17 in the direction of the two diametrical, stepped bores 16. Stepped bore 16 of the normally closed fluid valve is connected to a non-pressurized pressure fluid collecting means 26 by way of a second portion of the flow channel 18, while the stepped bore 16 of the normally open fluid valve is connected to the brake pressure generator 27 by way of a third portion of the flow channel 18.

Figure 4B:
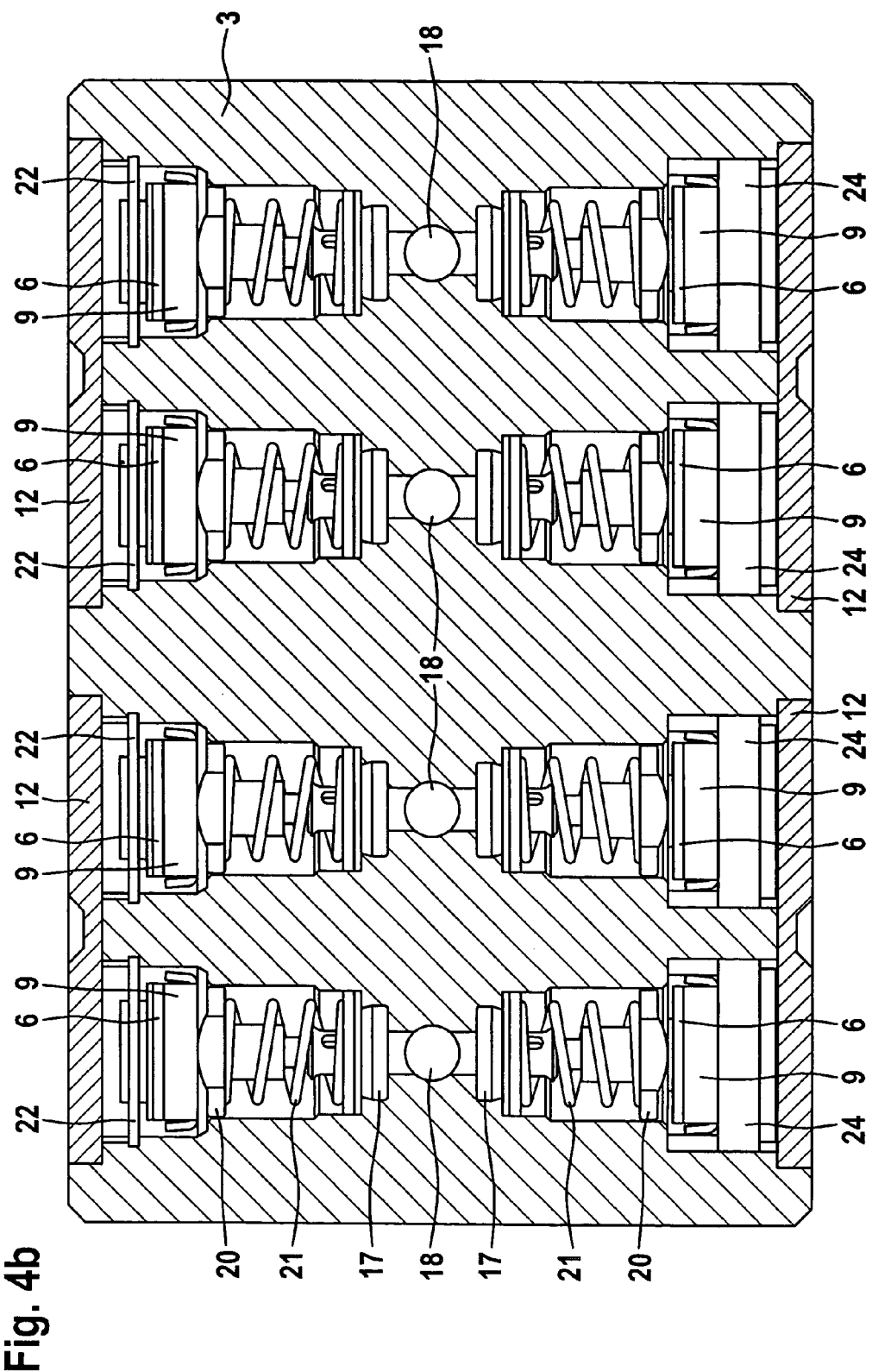
FIG. 4b is a cross-sectional view of the valve housing shown in FIG. 4a, folded at right angles, for the accommodation of eight fluid valves.

Eight fluid valves according to the design shown in FIG. 4a are used for a dual-circuit motor vehicle brake system with four-channel control, the result being a valve arrangement as shown in the illustration of FIG. 4b on the basis of FIG. 4a, wherein the normally open and normally closed fluid valves are arranged individually in separate pans 11 of the block-shaped valve housing 3, for example.

The invention claimed is:

1. Piezoelectrically actuated fluid valve, in particular for an electronically controllable motor vehicle brake system, comprising:
a valve housing opening into which is at least one flow channel, at whose port a valve seat is provided with which a valve closure member is associated that is operable by a piezoelectric bending transducer arranged in the valve housing for opening and closing the valve seat, said bending transducer being configured as a transverse beam that is fixed in the area of its first end in the valve housing by means of an immovable bearing, including an electrical contacting in the area of the immovable bearing for the actuation of the bending transducer, the bending transducer including a movable bearing in the valve housing at its second end remote from the immovable bearing, and in that the valve closure member points to the valve seat in a defined partial span width, preferably at half the span width, between the two ends of the bending transducer, the valve closure member being fitted to a valve tappet whose tappet head, under the effect of a valve spring, is urged against the bending transducer at a defined distance between the immovable and the movable bearing, with said valve tappet close to the valve closure member being centered with regard to the valve seat by means of a guiding sleeve, at which the end of the valve spring remote from the tappet head is supported, wherein the tappet head is adjustable lengthwise by means of a press fit at the valve tappet.

2. Fluid valve as claimed in claim 1,
wherein the bending transducer is comprised of several piezoceramic layers being preferably cemented with several subbases that are preferably arranged with several conductor paths on an accommodating plate, with said accommodating plate being supported with its one end on a ramp that is provided at a pan of the valve housing or at a bearing plate inserted into the pan.

3. Fluid valve as claimed in claim 1,
wherein the valve housing accommodates in the area of the movable bearing a ramp, on which the bending transducer is supported in a slidable way with its second end remote from the immovable bearing.

4. Fluid valve as claimed in claim 1,
wherein the immovable bearing is arranged beside an electrical contact pin that is fixed in the valve housing and extends through an opening in an accommodating plate carrying the bending transducer and several conductor paths.

5. Fluid valve as claimed in claim 4,
wherein the contact pin is arranged and electrically insulated preferably within a glass socket (14), with said contact pin being preferably inserted with glass socket into a first stepped bore of the valve housing that is in alignment with the opening in the accommodating plate.

6. Fluid valve as claimed in claim 5,
wherein in parallel beside the first stepped bore, there is a second stepped bore penetrated by the flow channel and accommodating a valve closure member that is operable by the bending transducer and directed towards a valve seat in the second stepped bore.

7. Fluid valve as claimed in claim 6,
wherein the bending transducer is positioned in a pan of the valve housing that is fluid-tightly closed by a cover, and the bottom of pan is penetrated by the two stepped bores.

8. Fluid valve as claimed in claim 7,
wherein the pan accommodates further bending transducers arranged in parallel side by side, whose conductor paths are electrically contacted by way of one single glass socket.

9. Piezoelectrically actuated fluid valve, in particular for an electronically controllable motor vehicle brake system, comprising:
a valve housing opening into which is at least one flow channel, at whose port a valve seat is provided with which a valve closure member is associated that is operable by a piezoelectric bending transducer arranged in the valve housing for opening and closing the valve seat, said bending transducer being configured as a transverse beam that is fixed in the area of its first end in the valve housing by means of an immovable bearing, including an electrical contacting in the area of the immovable bearing for the actuation of the bending transducer, said bending transducer including an additional bearing point in the valve housing at its second end remote from the immovable bearing, and in that the valve closure member points to the valve seat in a defined partial span width, preferably at half the span width, between the two ends of the bending transducer, said immovable bearing being arranged beside an electrical contact pin that is fixed in the valve housing and extends through an opening in an accommodating plate carrying the bending transducer and several conductor paths, said contact pin being arranged and electrically insulated preferably within a glass socket (14), with said contact pin being inserted with glass socket into a first stepped bore of the valve housing that is in alignment with the opening in the accommodating plate, wherein in parallel beside the first stepped bore, there is a second stepped bore penetrated by the flow channel and accommodating a valve closure member that is operable by the bending transducer and directed towards a valve seat in the second stepped bore.

10. Fluid valve as claimed in claim 9,
wherein the additional bearing point of the bending transducer is configured as a movable bearing.

11. Fluid valve as claimed in claim 9,
wherein the bending transducer is comprised of several piezoceramic layers being preferably cemented with several subbases that are preferably arranged with several conductor paths on an accommodating plate, with said accommodating plate being supported with its one end on a ramp that is provided at a pan of the valve housing or at a bearing plate inserted into the pan.

12. Fluid valve as claimed in claim 9, wherein the valve housing accommodates in the area of the movable bearing a ramp, on which the bending transducer is supported in a slidable way with its second end remote from the immovable bearing.

13. Fluid valve as claimed in claim 9,
wherein the bending transducer is positioned in a pan of the valve housing that is fluid-tightly closed by a cover, and the bottom of pan is penetrated by the two stepped bores.

14. Fluid valve as claimed in claim 13,
wherein the pan accommodates further bending transducers arranged in parallel side by side, whose conductor paths are electrically contacted by way of one single glass socket.

15. A piezoelectrically actuated fluid valve, in particular for an electronically controllable motor vehicle brake system, comprising:

a valve housing opening into which is at least one flow channel, at whose port a valve seat is provided with which a valve closure member is associated that is operable by a piezoelectric bending transducer arranged in the valve housing for opening and closing the valve seat, said bending transducer being configured as a transverse beam having a first end and a second end opposite the first end, the transverse beam being fixed in the area of its first end in the valve housing by means of an immovable bearing, including an electrical contacting in the area of the immovable bearing for the actuation of the bending transducer, wherein the bending transducer includes an additional bearing point in the valve housing at its second end remote from the immovable bearing, wherein the valve closure member extends transversely to the bending transducer and engages with the bending transducer at a point substantially midway between said immovable bearing and said additional bearing point.

* * * * *